United States Patent [19]
Aronowitz et al.

[11] Patent Number: 5,199,037
[45] Date of Patent: Mar. 30, 1993

[54] EXTENDED LASER LIFE

[75] Inventors: Frederick Aronowitz, Laguna Niguel; Frederick Vescial, Orange, both of Calif.

[73] Assignee: Rockwell International Corporation, Seal Beach, Calif.

[21] Appl. No.: 764,872

[22] Filed: Sep. 24, 1991

[51] Int. Cl.[5] ............................................. H01S 3/13
[52] U.S. Cl. ......................................... 372/31; 372/33; 372/29
[58] Field of Search .............................. 372/31, 33, 29

[56] References Cited

U.S. PATENT DOCUMENTS 4,856,008  8/1989  Senma et al. ...................... 372/31
5,128,950  7/1992  Tsuchiya et al. .................... 372/31

*Primary Examiner*—Leon Scott, Jr.
*Attorney, Agent, or Firm*—H. Fredrick Hamann; George A. Montanye; Tom Streeter

[57] ABSTRACT

Extended laser life may be obtained by measuring, with an ammeter AM, the discharge current applied to a laser (either linear or a ring laser gyro RLG), measuring the intensity of the resulting light beam with an intensity monitor IM, calculating the noise with an integrated circuit IC, and maintaining the discharge current at the lowest level possible which is consistent both with maintaining the intensity above the intensity service limit and the noise below the noise service limit.

20 Claims, 3 Drawing Sheets

EXTENDED LASER LIFE

BACKGROUND OF THE INVENTION

The present invention relates to lasers and has particular relation to extending the life of a laser.

In a typical laser, and particularly in a ring laser suitable for a ring laser gyroscope or ring laser gyro (RLG), the discharge current fed to the laser is maintained at a constant level. The intensity of the laser gradually fades until laser action no longer occurs. If purity and stability of the frequency of the emitted light is of concern, the noise included within this light will gradually rise. Eventually either the noise N will reach a noise service limit NSL, as shown in FIG. 1, or the intensity I will fall below an intensity service limit ISL as shown in FIG. 2. The laser will fail at a noise time NT, when the noise reaches the noise service limit, or at an intensity time IT, when the intensity reaches the intensity service limit, whichever comes first. The laser must then be replaced, rebuilt with new mirrors and/or new lasing material, or otherwise maintained.

SUMMARY OF THE INVENTION

It is an objective of the present invention to extend the life of a laser by maintaining the discharge current at the lowest level necessary to keep the intensity above the intensity service limit, the noise below the noise service limit, or both.

It is a feature of the present invention that the current may be controlled to keep either the noise or the intensity at the appropriate level, without attempting to control the other parameter, when the other parameter is of no interest.

It is an advantage of the present invention that it greatly extends the usable life of a laser without significantly adding to its cost.

DETAILED DESCRIPTION OF A PREFERRED EMBODIMENT

Figure 1:
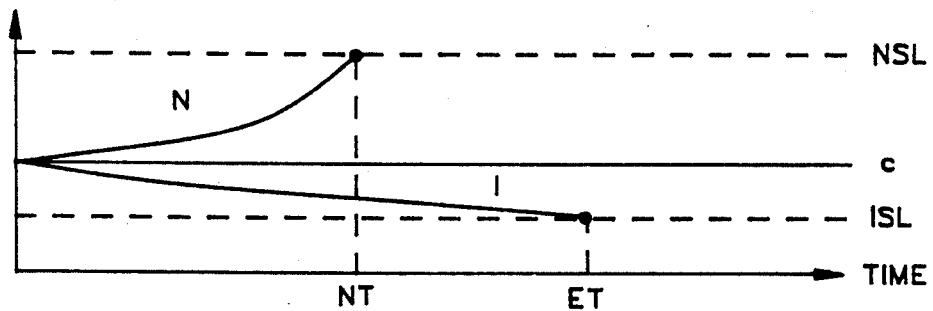
FIG. 1 is a graphical depiction of prior art operation of an RLG, showing time on the horizontal axis and showing current C, light intensity I, and noise N on the vertical axis; the RLG fails when the noise N reaches the noise service limit NSL at a noise time NT; this is before the intensity I reaches the intensity service limit ISL at an intensity time IT.

FIG. 1 shows the operation of a typical prior art laser. The current C is held constant, while the noise N gradually rises until it reaches the noise service limit NSL at a noise time NT, at which time the laser is no longer usable. It will, however, continue to emit light at intensity I until the intensity reaches the intensity service limit ISL at an intensity time IT, at which point the laser fails completely.

Figure 2:
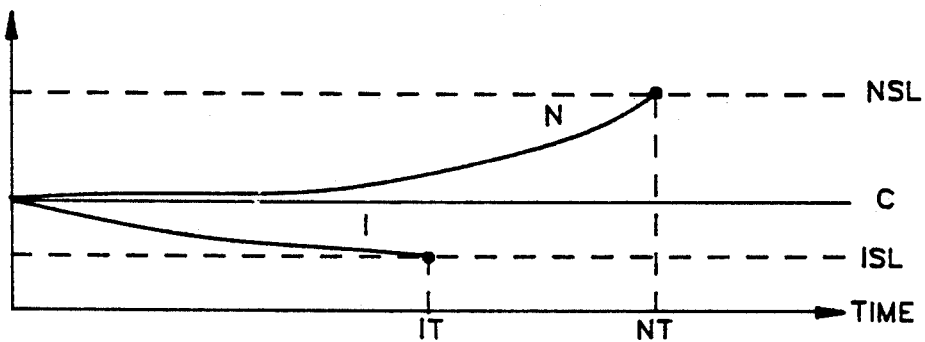
FIG. 2 is a prior art operating graph similar to FIG. 1, except that the RLG fails when the intensity becomes too low, i.e., NT occurs after IT rather than before it.

FIG. 2 shows an alternative prior art laser operation, in which noise is of a lesser concern than in the laser of FIG. 1. Here IT is less than NT, that is, the laser goes out before noise contamination becomes a serious problem. In either FIG. 1 or FIG. 2, the lifetime of the laser is shorter than desirable.

Figure 3:
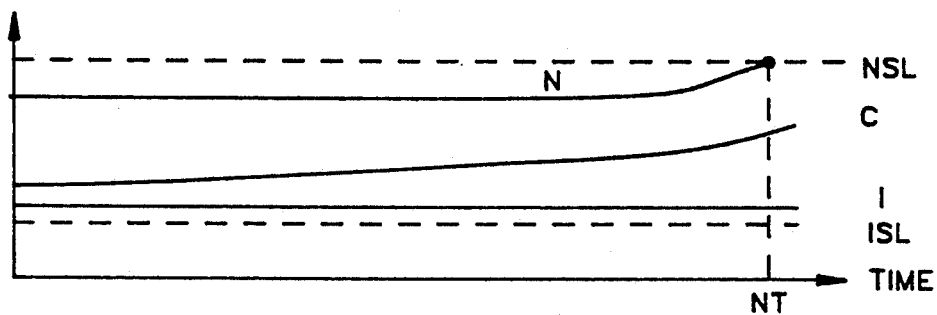
FIG. 3 graphs the operation of an RLG according to one embodiment of the present invention; C is started at the lowest level which will keep I above the ISL, and is gradually increased to maintain I at this level; the RLG fails when N rises above the NSL.

FIG. 3 shows the operation of one embodiment of a solution to this problem. Instead of starting both the current and intensity at a reasonably high level, the current is started at a reduced level, just what is needed to keep the intensity above the intensity service limit. As the mirrors and lasing material deteriorate, more and more current is required to maintain this low, constant intensity level. However, high currents, and associated high intensities, are two of the factors which accelerate mirror and material degradation in the first place. Therefore, although the intensity is kept much closer to its service limit, it does not cross it for a much longer period of time.

The reduced initial current not only brings the initial intensity closer to its service limit, but also brings the initial noise closer to its service limit. However, even though the noise starts at a level higher than that of prior art lasers, it increases much more slowly, because the current and intensity which degrade the mirrors and add to the noise are so much lower. Therefore, the time NT at which the noise crosses the noise service limit is much greater for the FIG. 3 apparatus than it is for either the FIG. 2 or FIG. 1 apparatus.

It is well known that the intensity I of the laser is a function of the laser's gain G and loss L as follows:

$$I = D(G/L - 1),$$

where D is the design parameter. Typical values for the foregoing are G=2500 parts per million, L=360 parts per million, D=8.4 microwatts, and I=50 microwatts. Typical mirror degradation will cause L to increase by 0.2 to 0.4 parts per million per day.

Similarly, noise N is a function of the gain and loss as follows:

$$N = EL(G-L)^{-1},$$

where E is another design parameter. In the foregoing example, a typical value is $E = 11.1$ deg/hr$^{\frac{1}{2}}$.

Finally, the gain G is proportional to the discharge current C:

$$G = FC,$$

where F is another design parameter.

Combining these equations, we may obtain the noise N as a function of the discharge current C and the laser intensity I (which are readily measured), and of the design parameters D, E, and F (which are known), as follows:

$$N = ED\left[\frac{FC}{(I+D)I}\right]^i$$

In some applications, noise can be measured directly, and the foregoing calculation need not be performed. In other applications, such a calculation is necessary. In either event, the laser must be taken out of service and be replaced, or be rebuilt with new mirrors and/or new lasing material, when the indicated noise increases over its service limit.

Figure 4:
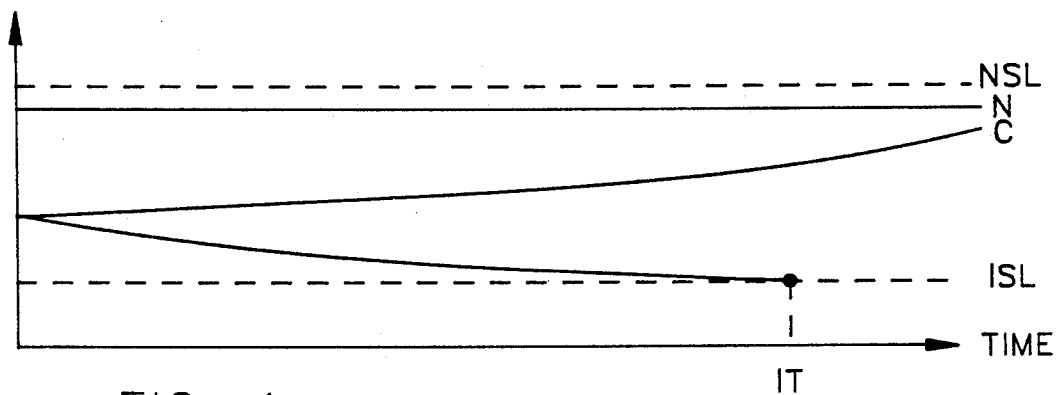
FIG. 4 graphs the operation of an embodiment which is a variant of the embodiment shown in FIG. 3; C is controlled to keep N just below the NSL, and the RLG fails when I falls below the ISL.

FIG. 4 shows the operation of a laser in a variation of the operation shown in FIG. 3. Here, instead of holding the intensity just above its service limit, and allowing the noise to eventually exceed its service limit, the noise is held just below its service limit, while the intensity is allowed to eventually fall below its service limit. Since the current C is being steadily increased to maintain the noise N at a constant level, the intensity I will fall off at a rate slower than that shown in either FIG. 1 or FIG. 2. Thus, although it starts off from a level lower than the level shown in either FIG. 1 or FIG. 2, the intensity time IT, at which the laser fails due to insufficient intensity, is greater than the intensity time IT for either the FIG. 1 or the FIG. 2 apparatus.

Figure 5:
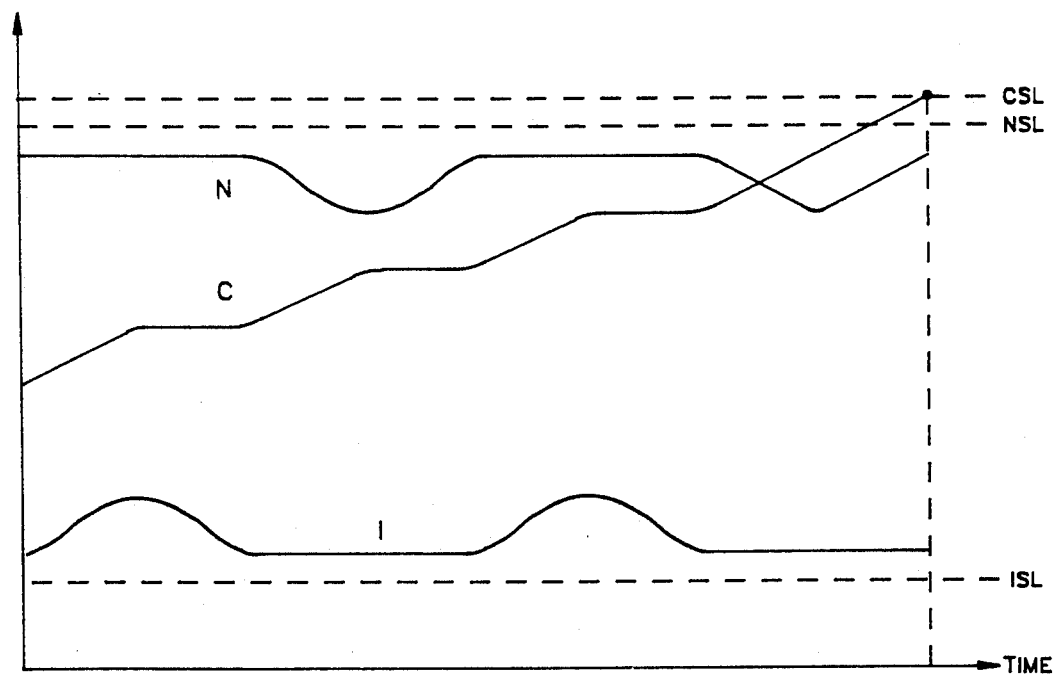
FIG. 5 graphs the operation of an embodiment combining the best features of the embodiments of FIGS. 3 and 4; C is increased whenever either N or I approaches its respective service limit, and the RLG fails only when C reaches the current service limit CSL.

FIG. 5 combines the best features of FIG. 3 and FIG. 4. In the apparatus whose operation is shown in FIG. 5, the current is increased whenever either the noise or the intensity approaches its service limit. In the example shown in FIG. 5, noise growth and intensity decay are made to fluctuate erratically in order to demonstrate the capabilities of this embodiment of the present invention. Thus, the current is increased rapidly during the early portion of the laser's life in order to maintain the noise below the noise service limit. In doing so, the intensity recedes fairly far away from the intensity service limit. Eventually, noise becomes less and less of a problem, and the current is allowed to stabilize at a constant value. This permits the intensity to reapproach its service limit, resulting in the current being raised again, this time pulling back the noise from its service limit. Eventually, the intensity becomes less of a problem, the current settles in at a second plateau, and the noise reapproaches its service limit. This process can be repeated as many times as desired.

Eventually, in an attempt to work with severely degraded mirrors, the current will rise to such a high level as to reach its own service limit. This current service limit CSL may be imposed by potential damage to the lasing material, limitations in the power supply, or any of a number of other parameters. In general, the laser's failure due to the current C having reached the current service limit CSL at a time CT will occur at a time much later than a failure due to either the noise N and/or the intensity I having reached its respective service limit.

The intensity, noise, and current service limits are shown herein as being constant, and such will usually be the case. In some applications these limits will vary with time or other parameters, including one another. The principle of using the minimum discharge current needed to meet all appropriate service limits remains unchanged.

Figure 6:
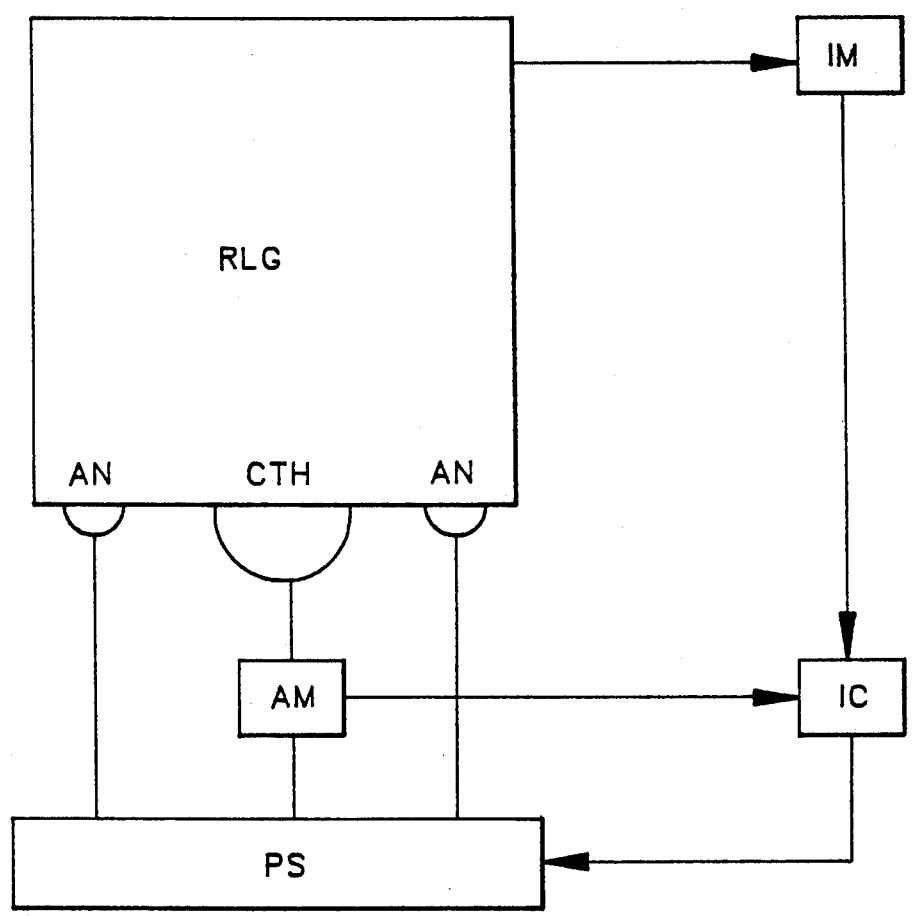
FIG. 6 is a schematic diagram of the embodiment, the operation of which is graphed in FIG. 5.

FIG. 6 shows schematically the apparatus whose operation is depicted in FIG. 5. A laser, in this case a ring laser used for a ring laser gyro RLG, is powered by a power supply PS which supplies current through an ammeter AM to a cathode CTH. The cathode excites the lasing gas, and current passes back to the power supply through a pair of anodes AN. Light from the ring laser gyro RLG falls on an intensity monitor IM which sends a signal representing the intensity to an integrated circuit IC. The integrated circuit IC also receives a signal from the ammeter AM indicating how much discharge current is being supplied to the cathode CTH. The integrated circuit IC may then calculate the noise and send a signal to the power supply PS whenever the noise N approaches the noise service limit NSL, the intensity I approaches the intensity service limit ISL, or both. If the application of the ring laser gyro is such that the noise N may be determined directly at the intensity monitor IM, then the complexity of the integrated circuit IC may be accordingly reduced, or its functions may even be incorporated within the intensity monitor IM.

While particular apparatus for determining the discharge current, intensity, and noise have been shown, it is apparent that any convenient apparatus performing these functions may be used.

INDUSTRIAL APPLICABILITY

The present invention is capable of exploitation in industry, and can be used, whenever it is desired to extend the life of a laser beyond that which is otherwise available. It can be made from elements which, considered separate and apart from one another, are entirely conventional, or it can be made from their nonconventional counterparts.

While particular embodiments of the present invention have been described above, the true spirit and scope of the present invention are not limited thereto, but are limited only by the following claims.

What is claimed is:

1. A method for extending a life of a laser by reducing a discharge current initially applied to the laser, comprising the steps of:
   (a) measuring an intensity of a laser;
   (b) comparing the intensity of the laser with a pre-established intensity service limit, below which the laser is in danger of falling; and
   (c) increasing a discharge current applied to the laser when the intensity of the laser approaches the intensity service limit, until the intensity of the laser falls below the intensity service limit.

2. The method of claim 1, wherein the laser is a ring laser.

3. A method for extending a life of a laser by reducing a discharge current initially applied to the laser, comprising the steps of:
   (a) measuring an intensity of a laser;
   (b) measuring a magnitude of a discharge current applied to the laser;
   (c) using the intensity of the laser and the magnitude of the discharge current to calculate a noise magnitude;
   (d) comparing the noise magnitude with a pre-established noise service limit, above which the laser is in danger of failing; and
   (e) increasing the discharge current applied to the laser when the noise magnitude approaches the noise service limit, until the noise magnitude rises above the noise service limit.

4. The method of claim 3, wherein the laser is a ring laser.

5. The method of claim 3, wherein the step of using the intensity of the laser and the magnitude of the discharge current to calculate the noise magnitude comprises the step of calculating:

$$N = ED\left[\frac{FC}{(I+D)I}\right]^{\frac{1}{2}}$$

where N is the noise magnitude, C is the magnitude of the discharge current, I is the intensity of the laser, and D, E, and F are design parameters; D being a fraction, the numerator of which is the product of the loss of the laser and the intensity of the laser, and the denominator of which is the difference between the gain of the laser and the loss of the laser; E being a fraction, the numerator of which is the product of the noise magnitude and the square root of the difference between the gain of the laser and the loss of the laser, and the denominator of which is the loss of the laser; and F being the ratio of the gain of the laser to the magnitude of the discharge current.

6. The method of claim 5, wherein the laser is a ring laser.

7. A method for extending a life of a laser by reducing a discharge current initially applied to the laser, comprising the steps of:
 (a) measuring an intensity of the laser;
 (b) measuring a magnitude of a discharge current applied to a laser;
 (c) using the intensity of the laser and the magnitude of the discharge current to calculate a noise magnitude;
 (d) comparing the intensity of the laser with a pre-established intensity service limit, below which the laser is in danger of failing;
 (e) comparing the noise magnitude with a pre-established noise service limit, above which the laser is in danger of failing, and
 (f) increasing the discharge current applied to the laser when the first to occur of the intensity of the laser approaching the intensity service limit and the noise magnitude approaching the noise service limit occurs, until the first to occur of the intensity of the laser falling below the intensity service limit and the noise magnitude rising above the noise service limit.

8. The method of claim 7, wherein the laser is a ring laser.

9. The method of claim 7, wherein the step of using the intensity of the laser and the magnitude of the discharge current to calculate the noise magnitude comprises the step of calculating:

$$N = ED\left[\frac{FC}{(I+D)I}\right]^{\frac{1}{2}}$$

where N is the noise magnitude, C is the magnitude of the discharge current, I is the intensity of the laser, and D, E, and F are design parameters; D being a fraction, the numerator of which is the product of the loss of the laser and the intensity of the laser, and the denominator of which is the difference between the gain of the laser and the loss of the laser; E being a fraction, the numerator of which is the product of the noise magnitude and the square root of the difference between the gain of the laser and the loss of the laser, and the denominator of which is the loss of the laser; and F being the ratio of the gain of the laser to the magnitude of the discharge current.

10. The method of claim 9, wherein the laser is a ring laser.

11. An apparatus for extending a life of a laser by reducing a discharge current initially applied to the laser, comprising:
 (a) means for measuring an intensity of a laser;
 (b) means for comparing the intensity of the laser with a pre-established intensity service limit, below which the laser is in danger of failing; and
 (c) means for increasing a discharge current applied to the laser when the intensity of the laser approaches the intensity service limit, until the intensity of the laser falls below the intensity service limit.

12. The apparatus of claim 11, wherein the laser is a ring laser.

13. An apparatus for extending a life of a laser by reducing a discharge current initially applied to the laser, comprising:
 (a) means for measuring an intensity of a laser;
 (b) means for measuring a magnitude of a discharge current applied to the laser;
 (c) means for using the intensity of the laser and the magnitude of the discharge current to calculate a noise magnitude;
 (d) means for comparing the noise magnitude with a pre-established noise service limit, above which the laser is in danger of failing; and
 (e) means for increasing the discharge current applied to the laser when the noise magnitude approaches the noise service limit, until the noise magnitude rises above the noise service limit.

14. The apparatus of claim 13, wherein the laser is a ring laser.

15. The apparatus of claim 13, wherein the means for using the intensity of the laser and the magnitude of the discharge current to calculate the noise magnitude comprises means for calculating:

$$N = ED\left[\frac{FC}{(I+D)I}\right]^{\frac{1}{2}}$$

where N is the noise magnitude, C is the magnitude of the discharge current, I is the intensity of the laser, and D, E, and F are design parameters; D being a fraction, the numerator of which is the product of the loss of the laser and the intensity of the laser, and the denominator of which is the difference between the gain of the laser and the loss of the laser; E being a fraction, the numerator of which is the product of the noise magnitude and the square root of the difference between the gain of the laser and the loss of the laser, and the denominator of which is the loss of the laser; and F being the ratio of the gain of the laser to the magnitude of the discharge current.

16. The apparatus of claim 15, wherein the laser is ring laser.

17. An apparatus for extending a life of a laser by reducing a discharge current initially applied to the laser, comprising:
 (a) means for measuring an intensity of a laser;
 (b) means for measuring a magnitude of a discharge current applied to the laser;

(c) means for using the intensity of the laser and the magnitude of the discharge current to calculate a noise magnitude;

(d) means for comparing the intensity of the laser with a pre-established intensity service limit, below which the laser is in danger of failing;

(e) means for comparing the noise magnitude with a pre-established noise service limit, above which the laser is in danger of failing; and (f) means for increasing the discharge current applied to the laser when the first to occur of the intensity of the laser approaching the intensity service limit and the noise magnitude approaching the noise service limit occurs, until the first to occur of the intensity of the laser falling below the intensity service limit and the noise magnitude rising above the noise service limit.

18. The apparatus of claim 17, wherein the laser is a ring laser.

19. The apparatus of claim 17, wherein the means for using the intensity of the laser and the magnitude of the discharge current to calculate the noise magnitude comprises means for calculating:

$$N = ED\left[\frac{FC}{(I+D)I}\right]^{\frac{1}{2}}$$

where N is the noise magnitude, C is the magnitude of the discharge current, I is the intensity of the laser, and D, E, and F are design parameters; D being a fraction, the numerator of which is the product of the loss of the laser and the intensity of the laser, and the denominator of which is the difference between the gain of the laser and the loss of the laser; E being a fraction, the numerator of which is the product of the noise magnitude and the square root of the difference between the gain of the laser and the loss of the laser, and the denominator of which is the loss of the laser; and F being the ratio of the gain of the laser to the magnitude of the discharge current.

20. The apparatus of claim 19, wherein the laser is a ring laser.

* * * * *